United States Patent

Lejeune

(10) Patent No.: US 9,832,528 B2
(45) Date of Patent: Nov. 28, 2017

(54) SYSTEM AND METHOD FOR MERGING NETWORK-BASED CONTENT WITH BROADCASTED PROGRAMMING CONTENT

(75) Inventor: Stephane Lejeune, San Diego, CA (US)

(73) Assignee: Sony Corporation, Tokyo (JP)

( * ) Notice: Subject to any disclaimer, the term of this patent is extended or adjusted under 35 U.S.C. 154(b) by 667 days.

(21) Appl. No.: 13/175,730

(22) Filed: Jul. 1, 2011

(65) Prior Publication Data

US 2012/0102526 A1 Apr. 26, 2012

Related U.S. Application Data

(60) Provisional application No. 61/405,585, filed on Oct. 21, 2010.

(51) Int. Cl.
| | | |
|---|---|---|
| *G06F 3/00* | (2006.01) | |
| *H04N 21/462* | (2011.01) | |
| *H04N 21/262* | (2011.01) | |
| *H04N 21/4722* | (2011.01) | |
| *H04N 21/482* | (2011.01) | |

(52) U.S. Cl.
CPC ... *H04N 21/4622* (2013.01); *H04N 21/26275* (2013.01); *H04N 21/4722* (2013.01); *H04N 21/4828* (2013.01)

(58) Field of Classification Search
USPC ..................................................... 725/39–47
See application file for complete search history.

(56) References Cited

U.S. PATENT DOCUMENTS

| | | |
|---|---|---|
| 3,785,721 A | 1/1974 | Harsch |
| 4,305,131 A | 12/1981 | Best |
| 4,821,097 A | 4/1989 | Robbins |
| 5,100,154 A | 3/1992 | Mullins |
| 5,111,410 A | 5/1992 | Nakayama et al. |
| 5,303,148 A | 4/1994 | Mattson et al. |
| 5,327,521 A | 7/1994 | Savic et al. |

(Continued)

FOREIGN PATENT DOCUMENTS

| | | |
|---|---|---|
| EP | 1990763 | 11/2008 |
| JP | H11119688 | 4/1999 |
| JP | 2006279334 | 10/2006 |

OTHER PUBLICATIONS

PCT Search Report dated Jan. 30, 2012 from corresponding PCT Application No. PCT/US2011/057397.

(Continued)

*Primary Examiner* — Jason K Lin
(74) *Attorney, Agent, or Firm* — John L. Rogitz

(57) ABSTRACT

According to one embodiment of the invention, a method comprising an operation of identifying what programming content is currently being transmitted or is scheduled to be displayed by an electronic device that is adapted to receive programming content from a live content broadcaster. A lookup of networked content providers having stored content associated with the programming content is performed and metadata associated with the stored content is obtained. Then, relational information from the metadata is produced. The relational information is output for rendering at least one advanced option icon that is adapted to provide enhanced viewing functionality.

8 Claims, 9 Drawing Sheets

(56) References Cited

U.S. PATENT DOCUMENTS

| | | |
|---|---|---|
| 5,410,326 A | 4/1995 | Goldstein |
| 5,446,485 A | 8/1995 | Vogel et al. |
| 5,559,707 A | 9/1996 | DeLorme et al. |
| 5,589,892 A | 12/1996 | Knee et al. |
| 5,600,765 A | 2/1997 | Ando et al. |
| 5,615,123 A | 3/1997 | Davidson et al. |
| 5,633,678 A | 5/1997 | Parulski et al. |
| 5,634,012 A | 5/1997 | Stefik et al. |
| 5,643,088 A | 7/1997 | Vaughn et al. |
| 5,679,075 A | 10/1997 | Forrest et al. |
| 5,682,525 A | 10/1997 | Bouve et al. |
| 5,710,887 A | 1/1998 | Chelliah et al. |
| 5,721,827 A | 2/1998 | Logan et al. |
| 5,727,093 A | 3/1998 | Uchiyama et al. |
| 5,727,201 A | 3/1998 | Burke |
| 5,732,216 A | 3/1998 | Logan et al. |
| 5,737,538 A | 4/1998 | Wilhite |
| 5,740,549 A | 4/1998 | Reilly et al. |
| 5,748,898 A | 5/1998 | Ueda |
| 5,760,916 A | 6/1998 | Dellert et al. |
| 5,768,142 A | 6/1998 | Jacobs |
| 5,768,528 A | 6/1998 | Stumm |
| 5,771,354 A | 6/1998 | Crawford |
| 5,781,665 A | 7/1998 | Cullen et al. |
| 5,794,006 A | 8/1998 | Sanderman |
| 5,802,292 A | 9/1998 | Mogul |
| 5,819,092 A | 10/1998 | Ferguson et al. |
| 5,845,062 A | 12/1998 | Branton et al. |
| 5,845,281 A | 12/1998 | Benson et al. |
| 5,852,450 A | 12/1998 | Thingvold |
| 5,855,516 A | 1/1999 | Elba |
| 5,857,074 A | 1/1999 | Johnson |
| 5,864,329 A | 1/1999 | Hirokawa |
| 5,872,637 A | 2/1999 | Nakanishi |
| 5,880,778 A | 3/1999 | Akagi |
| 5,881,168 A | 3/1999 | Takaoka et al. |
| 5,884,141 A | 3/1999 | Inoue et al. |
| 5,884,280 A | 3/1999 | Yoshioka et al. |
| 5,889,868 A | 3/1999 | Moskowitz et al. |
| 5,907,321 A | 5/1999 | Grossman et al. |
| 5,918,009 A | 6/1999 | Gehani et al. |
| 5,923,846 A | 7/1999 | Gage et al. |
| 5,937,392 A | 8/1999 | Alberts |
| 5,940,600 A | 8/1999 | Staats et al. |
| 5,940,806 A | 8/1999 | Danial |
| 5,942,969 A | 8/1999 | Wicks |
| 5,944,769 A | 8/1999 | Musk et al. |
| 5,948,040 A | 9/1999 | DeLorme et al. |
| 5,948,061 A | 9/1999 | Merriman |
| 5,949,875 A | 9/1999 | Walker et al. |
| 5,960,409 A | 9/1999 | Wexler |
| 5,963,664 A | 10/1999 | Kumar et al. |
| 5,968,120 A | 10/1999 | Guedalia |
| 5,970,143 A | 10/1999 | Schneier et al. |
| 5,974,451 A | 10/1999 | Simmons |
| 5,982,891 A | 11/1999 | Ginter et al. |
| 5,982,944 A | 11/1999 | Vaidyanathan et al. |
| 5,983,200 A | 11/1999 | Slotznick |
| 5,991,740 A | 11/1999 | Messer |
| 6,005,548 A | 12/1999 | Latypov et al. |
| 6,005,987 A | 12/1999 | Nakamura et al. |
| 6,006,197 A | 12/1999 | Bolt |
| 6,006,231 A | 12/1999 | Popa |
| 6,011,537 A | 1/2000 | Slotznick |
| 6,014,681 A | 1/2000 | Walker et al. |
| 6,014,701 A | 1/2000 | Chaddha |
| 6,018,761 A | 1/2000 | Uomini |
| 6,021,433 A | 2/2000 | Payne et al. |
| 6,023,701 A | 2/2000 | Malik et al. |
| 6,026,371 A | 2/2000 | Beck et al. |
| 6,034,593 A | 3/2000 | Chase |
| 6,035,323 A | 3/2000 | Narayen et al. |
| 6,041,316 A | 3/2000 | Allen |
| 6,044,181 A | 3/2000 | Szeliski et al. |
| 6,052,600 A | 4/2000 | Fette et al. |
| 6,058,379 A | 5/2000 | Odom et al. |
| 6,058,428 A | 5/2000 | Wang et al. |
| 6,067,095 A | 5/2000 | Danieli |
| 6,074,299 A | 6/2000 | Cohen |
| 6,075,551 A | 6/2000 | Berezowski et al. |
| 6,076,077 A | 6/2000 | Saito |
| 6,081,278 A | 6/2000 | Chen |
| 6,085,195 A | 7/2000 | Hoyt et al. |
| 6,088,702 A | 7/2000 | Plantz et al. |
| 6,097,389 A | 8/2000 | Morris et al. |
| 6,102,796 A | 8/2000 | Pajitnov et al. |
| 6,109,923 A | 8/2000 | Rothenberg |
| 6,123,362 A | 9/2000 | Squilla et al. |
| 6,147,742 A | 11/2000 | Bell et al. |
| 6,169,544 B1 | 1/2001 | Onoda |
| 6,178,258 B1 | 1/2001 | Sugimoto |
| 6,202,061 B1 | 3/2001 | Khosla et al. |
| 6,215,526 B1 | 4/2001 | Barton et al. |
| 6,216,112 B1 | 4/2001 | Fuller et al. |
| 6,222,947 B1 | 4/2001 | Koba |
| 6,224,486 B1 | 5/2001 | Walker et al. |
| 6,226,533 B1 | 5/2001 | Akahane |
| 6,236,333 B1 | 5/2001 | King |
| 6,237,010 B1 | 5/2001 | Hui et al. |
| 6,240,555 B1 * | 5/2001 | Shoff et al. .................. 725/110 |
| 6,252,634 B1 | 6/2001 | Yuen et al. |
| 6,272,231 B1 | 8/2001 | Maurer et al. |
| 6,282,330 B1 | 8/2001 | Yokota et al. |
| 6,301,555 B2 | 10/2001 | Hinderks |
| 6,301,586 B1 | 10/2001 | Yang et al. |
| 6,312,337 B1 | 11/2001 | Edwards et al. |
| 6,313,835 B1 | 11/2001 | Geyer et al. |
| 6,333,752 B1 | 12/2001 | Hasegawa et al. |
| 6,336,052 B1 | 1/2002 | Rannou |
| 6,340,971 B1 | 1/2002 | Janse et al. |
| 6,343,738 B1 | 2/2002 | Ogilvie |
| 6,358,341 B1 | 3/2002 | Bergquist |
| 6,362,900 B1 | 3/2002 | Squilla et al. |
| 6,369,835 B1 | 4/2002 | Lin |
| 6,369,837 B1 | 4/2002 | Schirmer |
| 6,396,963 B2 | 5/2002 | Shaffer et al. |
| 6,408,301 B1 | 6/2002 | Patton et al. |
| 6,411,744 B1 | 6/2002 | Edwards |
| 6,431,448 B1 | 8/2002 | Nelson et al. |
| 6,434,579 B1 | 8/2002 | Shaffer et al. |
| 6,437,797 B1 | 8/2002 | Ota |
| 6,441,854 B2 | 8/2002 | Fellegara et al. |
| 6,457,045 B1 | 9/2002 | Hanson et al. |
| 6,463,468 B1 | 10/2002 | Buch et al. |
| 6,469,711 B2 | 10/2002 | Foreman et al. |
| 6,484,189 B1 | 11/2002 | Gerlach et al. |
| 6,490,000 B1 | 12/2002 | Schaefer et al. |
| 6,496,851 B1 | 12/2002 | Morris et al. |
| 6,505,169 B1 | 1/2003 | Bhagavath et al. |
| 6,509,910 B1 | 1/2003 | Agarwal et al. |
| 6,512,570 B2 | 1/2003 | Garfinkle et al. |
| 6,522,418 B2 | 2/2003 | Yokomizo et al. |
| 6,546,556 B1 | 4/2003 | Kataoka et al. |
| 6,567,983 B1 | 5/2003 | Shiimori |
| 6,571,221 B1 | 5/2003 | Stewart et al. |
| 6,571,255 B1 | 5/2003 | Gonsalves et al. |
| 6,573,927 B2 | 6/2003 | Parulski et al. |
| 6,578,014 B1 | 6/2003 | Murcko |
| 6,583,799 B1 | 6/2003 | Manolis et al. |
| 6,590,586 B1 | 7/2003 | Swenton-Wall et al. |
| 6,595,417 B2 | 7/2003 | O'Hagan et al. |
| 6,636,648 B2 | 10/2003 | Loui et al. |
| 6,643,663 B1 | 11/2003 | Dabney et al. |
| 6,686,918 B1 | 2/2004 | Cajolet |
| 6,698,020 B1 | 2/2004 | Zigmond et al. |
| 6,704,671 B1 | 3/2004 | Umminger, III |
| 6,747,674 B1 | 6/2004 | Asami |
| 6,795,863 B1 | 9/2004 | Doty |
| 6,892,351 B2 | 5/2005 | Vasudevan et al. |
| 6,914,625 B1 | 7/2005 | Anderson et al. |
| 6,950,623 B2 | 9/2005 | Brown et al. |
| 6,982,649 B2 | 1/2006 | Blum et al. |
| 7,017,173 B1 | 3/2006 | Armstrong et al. |
| 7,079,752 B1 | 7/2006 | Leyendecker |

(56) References Cited

U.S. PATENT DOCUMENTS

| | | | |
|---|---|---|---|
| 7,185,352 B2 | 2/2007 | Hallford et al. | |
| 7,334,251 B2 | 2/2008 | Rodrigues et al. | |
| 7,357,316 B2 | 4/2008 | Heckel et al. | |
| 7,418,191 B2 | 8/2008 | Unger | |
| 7,443,295 B2 | 10/2008 | Brice et al. | |
| 7,463,160 B2 | 12/2008 | Crook | |
| 7,730,405 B2 | 6/2010 | Gulli et al. | |
| 7,814,522 B2 | 10/2010 | Asmussen | |
| 8,321,892 B1 | 11/2012 | Malaby | |
| 8,407,595 B1 | 3/2013 | Edwards et al. | |
| 2001/0003212 A1 | 6/2001 | Marler et al. | |
| 2001/0029610 A1* | 10/2001 | Corvin et al. | 725/42 |
| 2001/0032229 A1 | 10/2001 | Hulls et al. | |
| 2001/0034646 A1 | 10/2001 | Hoyt et al. | |
| 2001/0037205 A1 | 11/2001 | Joao | |
| 2001/0037235 A1 | 11/2001 | Gotoh et al. | |
| 2002/0013949 A1 | 1/2002 | Hejna | |
| 2002/0038456 A1 | 3/2002 | Hansen et al. | |
| 2002/0052785 A1 | 5/2002 | Tenenbaum | |
| 2002/0059364 A1 | 5/2002 | Coulthard et al. | |
| 2002/0078444 A1 | 6/2002 | Krewin et al. | |
| 2002/0083441 A1 | 6/2002 | Flickinger et al. | |
| 2002/0085023 A1 | 7/2002 | Zustak et al. | |
| 2002/0087402 A1 | 7/2002 | Zustak et al. | |
| 2002/0100041 A1 | 7/2002 | Rosenberg et al. | |
| 2002/0118182 A1 | 8/2002 | Weindorf | |
| 2002/0129362 A1 | 9/2002 | Chang et al. | |
| 2002/0144262 A1 | 10/2002 | Plotnick et al. | |
| 2002/0169970 A1 | 11/2002 | Candelore | |
| 2002/0178443 A1 | 11/2002 | Ishii | |
| 2002/0178445 A1 | 11/2002 | Eldering et al. | |
| 2002/0194081 A1 | 12/2002 | Perkowski | |
| 2002/0194593 A1 | 12/2002 | Tsuchida et al. | |
| 2003/0028791 A1 | 2/2003 | Mizobata | |
| 2003/0028873 A1 | 2/2003 | Lemmons | |
| 2003/0037330 A1 | 2/2003 | Makofka | |
| 2003/0066078 A1 | 4/2003 | Bjorgan et al. | |
| 2003/0070169 A1 | 4/2003 | Beyers, II et al. | |
| 2003/0079226 A1 | 4/2003 | Barrett | |
| 2003/0093493 A1 | 5/2003 | Watanabe et al. | |
| 2003/0115587 A1 | 6/2003 | Kendall et al. | |
| 2003/0133019 A1 | 7/2003 | Higurashi et al. | |
| 2003/0149975 A1 | 8/2003 | Eldering et al. | |
| 2003/0154475 A1 | 8/2003 | Rodriguez et al. | |
| 2003/0163431 A1 | 8/2003 | Ginter et al. | |
| 2003/0188308 A1 | 10/2003 | Kizuka | |
| 2003/0208469 A1 | 11/2003 | Stern | |
| 2004/0001002 A1 | 1/2004 | Blum et al. | |
| 2004/0003402 A1 | 1/2004 | McKenna, Jr. | |
| 2004/0003406 A1 | 1/2004 | Billmaier | |
| 2004/0030599 A1 | 2/2004 | Sie et al. | |
| 2004/0034874 A1 | 2/2004 | Hord et al. | |
| 2004/0103028 A1 | 5/2004 | Littman et al. | |
| 2004/0103429 A1 | 5/2004 | Carlucci et al. | |
| 2004/0225564 A1 | 11/2004 | Walsh et al. | |
| 2004/0249489 A1 | 12/2004 | Dick | |
| 2004/0261100 A1 | 12/2004 | Huber et al. | |
| 2005/0055715 A1* | 3/2005 | Minnick et al. | 725/58 |
| 2005/0068928 A1 | 3/2005 | Smith et al. | |
| 2005/0076359 A1 | 4/2005 | Pierson et al. | |
| 2005/0100321 A1 | 5/2005 | Koudo et al. | |
| 2005/0132420 A1 | 6/2005 | Howard et al. | |
| 2005/0149968 A1 | 7/2005 | Konig et al. | |
| 2005/0172319 A1 | 8/2005 | Reichardt et al. | |
| 2005/0216932 A1 | 9/2005 | Danker | |
| 2005/0247735 A1 | 11/2005 | Muderlak et al. | |
| 2005/0283800 A1* | 12/2005 | Ellis et al. | 725/40 |
| 2006/0013557 A1 | 1/2006 | Poslinski | |
| 2006/0013577 A1 | 1/2006 | Poslinski | |
| 2006/0031892 A1 | 2/2006 | Cohen | |
| 2006/0067290 A1 | 3/2006 | Miwa et al. | |
| 2006/0085816 A1 | 4/2006 | Funk et al. | |
| 2006/0091203 A1 | 5/2006 | Bakker et al. | |
| 2006/0143647 A1 | 6/2006 | Bill | |
| 2006/0165103 A1 | 7/2006 | Trudeau et al. | |
| 2006/0168616 A1 | 7/2006 | Candelore | |
| 2006/0212904 A1 | 9/2006 | Klarfiled et al. | |
| 2007/0078715 A1 | 4/2007 | Murakami | |
| 2007/0094691 A1 | 4/2007 | Gazdzinski | |
| 2007/0100514 A1 | 5/2007 | Park | |
| 2007/0129017 A1 | 6/2007 | Dalsgaard et al. | |
| 2007/0194131 A1 | 8/2007 | Brown et al. | |
| 2007/0204292 A1 | 8/2007 | Riedl et al. | |
| 2007/0241203 A1 | 10/2007 | Wagner et al. | |
| 2008/0005505 A1* | 1/2008 | Maegawa | 711/156 |
| 2008/0046922 A1* | 2/2008 | Jankins et al. | 725/35 |
| 2008/0052739 A1 | 2/2008 | Logan | |
| 2008/0052750 A1 | 2/2008 | Grunnet-Jepsen et al. | |
| 2008/0077422 A1 | 3/2008 | Dooley et al. | |
| 2008/0098421 A1 | 4/2008 | Rodriguez et al. | |
| 2008/0136611 A1 | 6/2008 | Benco et al. | |
| 2008/0147488 A1 | 6/2008 | Tunick et al. | |
| 2008/0155585 A1 | 6/2008 | Craner et al. | |
| 2008/0276266 A1 | 11/2008 | Huchital et al. | |
| 2008/0282285 A1 | 11/2008 | Thomas et al. | |
| 2008/0307454 A1 | 12/2008 | Ahanger et al. | |
| 2009/0101706 A1 | 4/2009 | Boyd | |
| 2009/0132275 A1 | 5/2009 | Jung et al. | |
| 2009/0138353 A1 | 5/2009 | Mendelson | |
| 2009/0153736 A1 | 6/2009 | Mortensen | |
| 2009/0158314 A1 | 6/2009 | Flynn | |
| 2009/0164652 A1 | 6/2009 | Slobotskoy et al. | |
| 2009/0172723 A1 | 7/2009 | Shikedi et al. | |
| 2009/0201998 A1 | 8/2009 | Komoriya | |
| 2009/0249411 A1* | 10/2009 | Sakakima | H04N 7/17318 725/89 |
| 2009/0262242 A1 | 10/2009 | Castano | |
| 2010/0119206 A1 | 5/2010 | Craner et al. | |
| 2010/0125870 A1* | 5/2010 | Ukawa | H04N 7/17318 725/32 |
| 2010/0146077 A1 | 6/2010 | Davies et al. | |
| 2010/0162324 A1* | 6/2010 | Mehta | H04N 7/17318 725/61 |
| 2010/0166389 A1 | 7/2010 | Knee et al. | |
| 2010/0175079 A1 | 7/2010 | Braun et al. | |
| 2010/0218208 A1 | 8/2010 | Holden | |
| 2010/0222046 A1 | 9/2010 | Cumming | |
| 2010/0269145 A1* | 10/2010 | Ingrassia | H04H 20/24 725/110 |
| 2010/0287592 A1* | 11/2010 | Patten et al. | 725/59 |
| 2010/0290761 A1 | 11/2010 | Drake et al. | |
| 2011/0011920 A1 | 1/2011 | Harris | |
| 2011/0029875 A1 | 2/2011 | Milch | |
| 2011/0072456 A1 | 3/2011 | White et al. | |
| 2011/0134991 A1 | 6/2011 | Gregotski et al. | |
| 2011/0149159 A1 | 6/2011 | Candelore et al. | |
| 2011/0149160 A1 | 6/2011 | Shintani et al. | |
| 2011/0150452 A1 | 6/2011 | Toda | |
| 2011/0219400 A1 | 9/2011 | Candelore et al. | |
| 2011/0219401 A1 | 9/2011 | Candelore et al. | |
| 2011/0219402 A1 | 9/2011 | Candelore et al. | |
| 2014/0150017 A1 | 5/2014 | Chang | |

OTHER PUBLICATIONS

Brant Candelore, Frederick J. Zustak: "Apparatus and Method for Repacing a Broadcasted Advertisement Based on Both Heuristic Information and Attempts in Altering the Playback of the Advertisement", related U.S. Appl. No. 12/772,544, Final Office Action dated Jun. 15, 2015.

Brant L. Candelore, Frederick J. Zustak, "Apparatus and Method for Registering and the Subsequent Selection of User Selected Advertisement During Playback", file history of related U.S. Appl. No. 12/718,628, filed Mar. 5, 2010.

Brant L. Candelore, Frederick J. Zustak, "Apparatus and Method for Replacing a Broadcasted Advertisement Based on both Information and Attempts in Altering the Playback of the Advertisement", file history of related U.S. Appl. No. 12/772,544, filed May 3, 2010.

Peter Shintani, Brant L. Candelore, "System and Method for Actively Managing Play Back of Demo Content by a Display Device Based on Detection Radio Frequency Signaling", file history of related U.S. Appl. No. 12/643,870, filed Dec. 21, 2009.

(56) References Cited

OTHER PUBLICATIONS

Robert Hardacker, Brant Candelore, Chris Read, "Providing Information Related to Video Content", file history of related pending U.S. Appl. No. 11/737,363, filed Apr. 19, 2007.
Wowza Media Systems, Wowza Media Server Pro, www.wowzamedia.com/resources/WowzaMediaServerPro_UserGuide.pdf, 2006.
Brant L. Candelore, Frederick J. Zustak, "Apparatus and Method for Replacing a Broadoasted Advertisement Based on Both Heuristic, Information and Attempts in Altering the Playback of the Advertisement", retated U.S. Appl. No. 12/772,544, Non-Final Office Action dated Jul. 30, 2015.
Brant L Candelore, Frederick J. Zustak. "Apparatus and Method for Replacing a Broadcasted Advertisement Based on Both Heuristic Information and Attempts in Altering the Playback of the Advertisement", related U.S. Appl. No. 12/772,544, Applicant's response to Non-Final Office Action filed Aug. 5, 2015.
Brant L. Candelore, Frederick J. Zustak, "Apparatus and Method for Registering and the Subsequent Selection of User Selected Advertisement During Playback", related U.S. Appl. No. 12/718,628, Final Office Action dated Sep. 8, 2015.
Brant L. Candelore, Frederick J. Zustak, "Apparatus and Method for Replacing a Broadcasted Advertisement Based on Both Heuristic Information and Attempts in Altering the Playback of the Advertisement", related U.S. Appl. No. 12/772,544, Applicant's response to Final Office Action filed Jun. 24, 2015.
Brant L. Candelore, Frederick J. Zustak, "Apparatus and Method for Registering and the Subsequent Selection of User Selected Advertisement During Playback", related U.S. Appl. No. 12/718,628, Non-Final Office Action dated Jul. 21, 2015.
Brant L. Candelore, Frederick J. Zustak, "Apparatus and Method for Registering and the Subsequent Selection of User Selected Advertisement During Playback", related U.S. Appl. No. 12/718,628, Applicant's response to Non-Final Office Action filed Jul. 28, 2015.
Brant L. Candelore, Frederick J. Zustak, "Apparatus and Method for Registering and the Subsequent Selection of User Selected Advertisement During Playback", related U.S. Appl. No. 12/718,628, Non-Final Office Action dated Jun. 24, 2016.
Brant L. Candelore, Frederick J. Zustak, "Apparatus and Method for Registering and the Subsequent Selection of User Selected Advertisement During Playback", related U.S. Appl. No. 12/718,628, Applicant's response to Non-Final Office Action filed Sep. 26, 2016.

\* cited by examiner

FIG. 9B
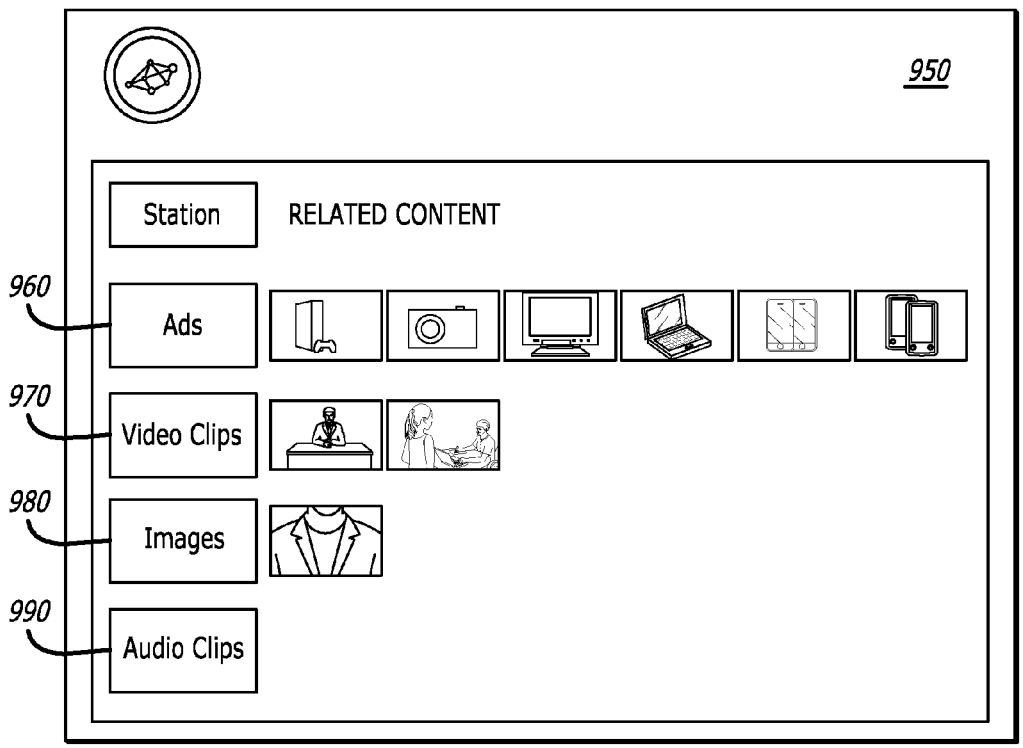
FIG. 10
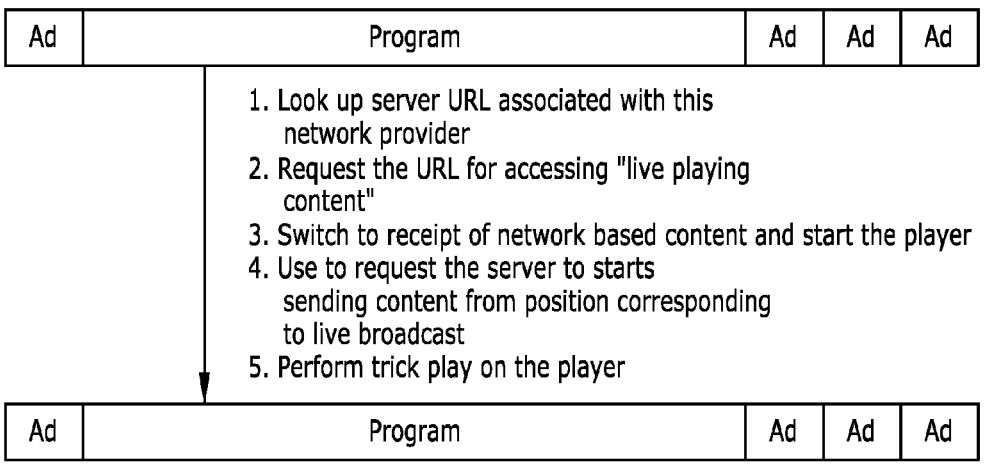

SYSTEM AND METHOD FOR MERGING NETWORK-BASED CONTENT WITH BROADCASTED PROGRAMMING CONTENT

CROSS-REFERENCE TO RELATED APPLICATIONS

This application claims priority on U.S. Provisional Application No. 61/405,585 filed Oct. 21, 2010, the contents of which are incorporated in its entirety.

FIELD

The invention generally relates to the field of content delivery. More particularly, one and more embodiments of the invention relate to a system and method for providing selective access to both network-based content and broadcasted programming content by (i) aggregating metadata for network-based content that corresponds to the scheduled, broadcasted programming content and (ii) associating the metadata with the corresponding network-based content. This enables the system to provide features that enhance the user's viewing or listening experience and to substitute advertisements being part of the broadcasted programming content.

BACKGROUND

Over the last few years, the television industry has seen a convergence of Internet based content and broadcasted programming content. For instance, on or around 2007, Sony Corporation released a product, BRAVIA® Internet Video Link (BIVL™), that offered users an ability to stream free standard and high-definition content through a broadband connection directly to the television, thereby bypassing any set-top boxes or computers. This functionality enabled access to Internet based content, such as SONY® videos as well as videos from other providers. While both Internet based and broadcasted programming content are made available to BIVL™ users, the BIVL™ platform is not adapted to maintain relational information concerning which broadcasted programming content has corresponding network-based content so as to provide the viewer with an ability to interchange the broadcasted programming content with Internet based content with timely confirmation that such content is available.

BRIEF DESCRIPTION OF THE DRAWINGS

Embodiments of the invention may best be understood by referring to the following description and accompanying drawings that are used to illustrate embodiments of the invention.

FIG. 9B is an exemplary embodiment of a third advanced option supported by the metadata aggregation system that, when selected, illustrates selectable images of products related to a specific program series currently being broadcast.

FIG. 10 is an exemplary embodiment of a fourth advanced option supported by the metadata aggregation system that, when selected, substitutes a specific program series currently being broadcast with network-based content generally at the same period of time within the storyline of the specific program series.

DETAILED DESCRIPTION

Figure 1:
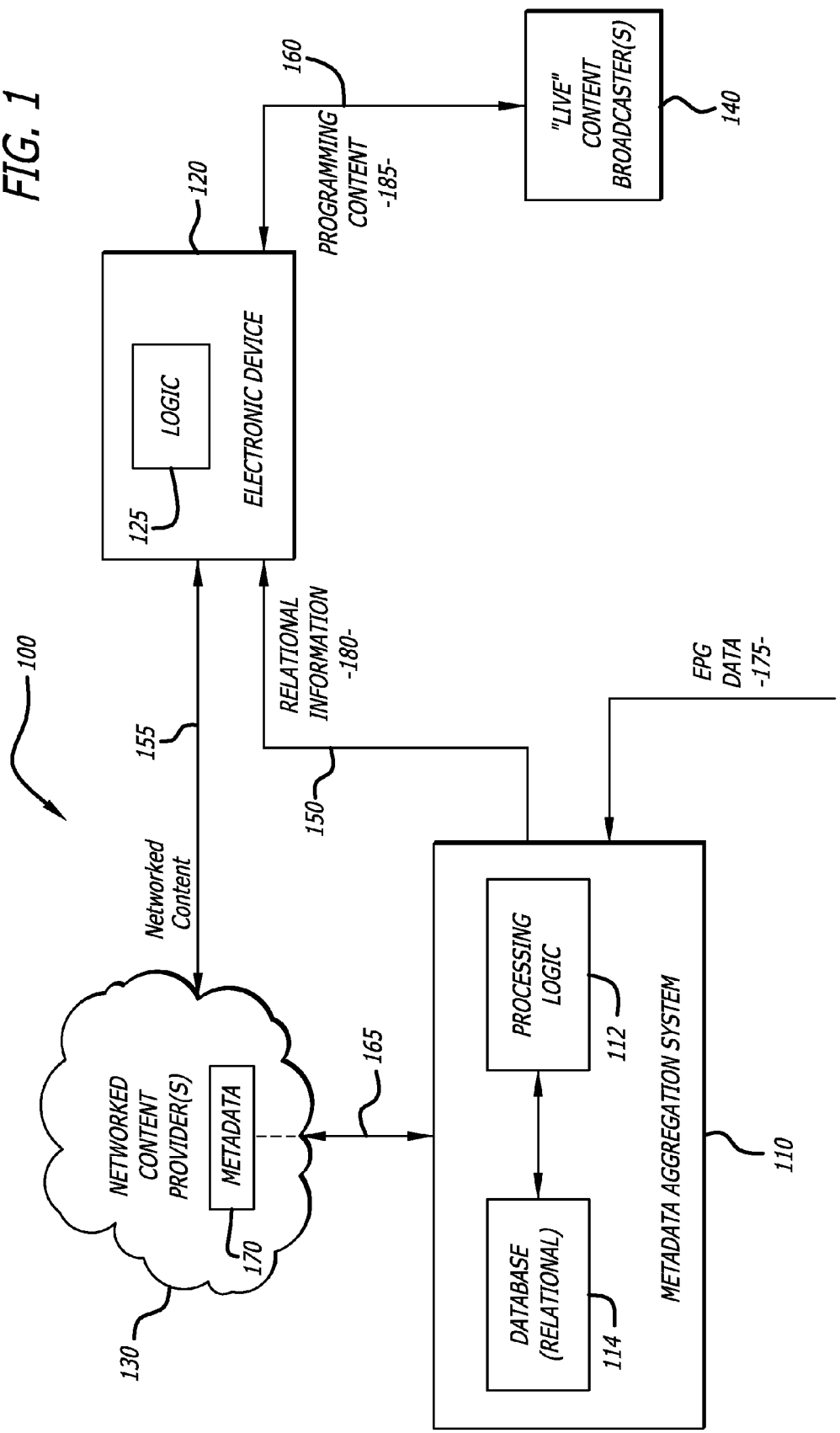
FIG. 1 is a first exemplary embodiment of a content transmission system having multiple content sources.

Herein, for the purposes of explanation, numerous specific details are set forth in order to provide a thorough understanding of the invention. It will be apparent; however, to one skilled in the art that the invention may be practiced without some of these specific details. In addition, the following description provides examples, and the accompanying drawings show various examples for the purposes of illustration. However, these examples should not be construed in a limiting sense as they are merely intended to provide examples of embodiments of the invention rather than to provide an exhaustive list of all possible implementations. Also, in some instances, well-known structures and devices are not shown in block diagram form in order to avoid obscuring the details of the disclosed features of various described embodiments of the invention.

In the following description, certain terminology is used to describe certain features of the invention. For instance, a "message" is generally defined as information organized into a selected format for transmission over an interconnect. An "advanced option" is information that, upon selection by the user, provides enhanced viewing functionality based on communications with a networked content provider. The term "interconnect" generally refers to an information-carrying medium, coupled to communication interfaces of the source and destination, which establishes a communication pathway. Examples of the medium include a physical medium (e.g., electrical wire, optical fiber, cable, bus traces, etc.) or even a wireless medium (e.g., air in combination with wireless signaling technology).

The term "logic" generally refers to electronic hardware and/or software configured to perform one or more functions. According to one embodiment of the invention, hardware may include one or more integrated circuits that process data. This data may be "metadata," which is generally defined as data that provides information about its associated content. Software generally refers to a logical structure, a program, a routine, a process, an applet, a link, or the like. The software may be stored in any type of machine readable medium such as a programmable electronic circuit, a semiconductor memory device such as volatile memory (e.g., random access memory, etc.) and/or non-volatile memory such as any type of read-only memory (ROM) or flash memory, a portable storage medium (e.g., Universal Serial Bus "USB" drive, optical disc, digital tape), or the like.

The term "content" generally refers to information that can be perceived by a targeted audience such as information that can be displayed (e.g., video) and/or information that can be heard (e.g., audio). One type of content is referred to as "programming content," which constitutes video and/or audio that is provided by a live content broadcaster and played back in accordance with a scheduled time slot. Examples of programming content include televised programs (e.g., an episode of a television series, a sporting game, a movie, etc.), a song or musical composition, or the like. Another type of content is referred to as an "advertisement," which constitutes video and/or audio produced to encourage the purchase of the featured good and/or service. Yet another type of content is referred to as "network-based" or "stored" content, which constitutes video and/or audio stored within and capable of being accessed from a network for playback in lieu of the programming content.

Also, the term "electronic device" is generally defined as electronics with display and/or audio playback capabilities. Such capabilities may be supported by integrated video and/or audio playback components or by one or more connectors that can be connected to route video to an external display screen and/or audio to external speakers. Examples of the electronic device include, but are not limited or restricted to a flat panel television (e.g., cathode ray tube "CRT", liquid crystal display "LCD", plasma, organic light-emitting diode "OLED", or any television with another type of display technology), a music playback system, any peripheral device in communication with the television (e.g., set-top box), a computer, a video game console, or the like.

Referring to FIG. 1, a first exemplary embodiment of a content transmission system 100 is shown. According to this embodiment of the invention, content transmission system 100 comprises a metadata aggregation system 110 in communication with an electronic device 120 over a first interconnect 150. Electronic device 120 is adapted to receive content from multiple sources, namely one or more networked content providers 130 via a second interconnect 155 and one or more live content broadcasters 140 via a third interconnect 160. Electronic device 120 includes an optional display screen and logic 125 that, upon receipt of content from content provider(s) 130 and/or broadcaster(s) 140, processes such content to produce video and/or audio for playback (e.g., display, digital-to-analog conversion for output to speakers or earphone connector, etc.).

Herein, a "live content broadcaster" is generally defined as a source for scheduled content that may include, but is not limited or restricted to a cable head-end, a satellite receiver and/or transmitter that is responsible for content over a satellite feed, telecommunications operator (telco), a wireless signaling transmitter, and the like. A "networked content provider" generally refers to a source for non-scheduled, stored content accessible over a network (e.g., a web server).

Metadata aggregation system 110 comprises processing logic 112 and an internal memory, which contains a database 114. Processing logic 112 is adapted to support communications with a networked content provider 130 over interconnect 165. This associative information permits metadata aggregation system 110 to retrieve the metadata 170 associating the stored content that relates to programming content scheduled to be broadcast from the corresponding live content broadcaster(s) 140. Metadata 170 may include, but is not limited or restricted to one or more of the following: content attributes (e.g., program title, genre type, synopsis, rating, cast information, director information, episode number, etc.), format attributes (e.g., file format, file size, bit rate, coding, etc.), entitlements, timing information, and addressing information (e.g., network address, a link to particular location within data storage controlled by content provider(s) 130, etc.) or the like.

Herein, the degree of metadata 170 returned by networked content provider 130 may be limited. For instance, a request for metadata from metadata aggregation system 110 may include filtering parameters, namely information received or gathered by metadata aggregation system 110 that assists in targeting what type of metadata to return. Examples of such parameters may include, but are not limited or restricted to (i) timing information (e.g., the time of day at which the metadata request is sent, (ii) geographic information (e.g., time zone or a current zip code in which the electronic device resides), or the like.

As an illustrative example, the particular time at which a request for metadata is transmitted can be used to (i) limit the metadata requested to only metadata associated with network-based content corresponding to the programming content being broadcast at or after this point of time, or (ii) filter out metadata associated with programming content broadcast before this point of time. Also, the geographic information for electronic device 120 may be provided so that networked content providers 130, by accessing the appropriate electronic programming guide (EPG) data directly, can better discern what programming content is scheduled to be broadcast at that location. As a result, the requests for metadata can avoid unnecessary retrieval of metadata associated with stored content that has no correspondence with the broadcasted programming content.

As shown in FIG. 1, processing logic 112 may be adapted to operate, at least in part, as a database management system (DBMS) that controls storage, retrieval, deletion, security, and integrity of data within database 114. Where database 114 is a relational database, metadata 170 is received and grouped according to a selected schema that allows for subsequent recovery of metadata 170 to locate content, such as programming or advertisements, which is associated with the broadcasted programming content. For instance, the schema may aggregate metadata associated with episodes for a particular television program on a season-by-season basis or by episode number. Alternatively, the schema may aggregate content based on genre, actor, time slot (e.g., day and/or time of day), or the like.

Processing logic 112 downloads relational information 180 to electronic device 120. Relational information 180 may include data representative of at least a portion of metadata 170 such as hyperlinks and other information (e.g., entitlements, time slot, etc.) that provide a user of electronic device 120 with an ability of navigate to web pages stored by a networked content provider 130. For instance, electronic device 120 subsequently uses relational information 180 in providing the functionality for certain displayed objects. These displayable objects may be in the form of icons, each representing a different advanced option as described below.

Upon selection of a displayed object, metadata aggregation system 110 and electronic device 120 operate to provide a substantially seamless transition from the display of broadcasted programming content to the display of network-based content, or vice versa. In other words, selection of a displayed object may cause electronic device 120 to access a particular website and retrieve specific stored content.

More specifically, electronic device 120 receives relational information 180 from metadata aggregation system 110 as well as broadcasted programming content 185 from live content broadcaster(s) 140 via interconnect 160. Where both relational information 180 and programming content 185 are uploaded to electronic device 120 for display, displayable objects associated with relational information 180 are generated and positioned to overlay a portion of the currently displayed programming content. Upon selecting a particular displayable object, a request for content is initiated from electronic device 120 to networked content provider(s) 130 over interconnect 155. The requested content is retrieved and sent via interconnect 155 to electronic device 120 so as to simulate playback of programming content 185.

Figure 2:
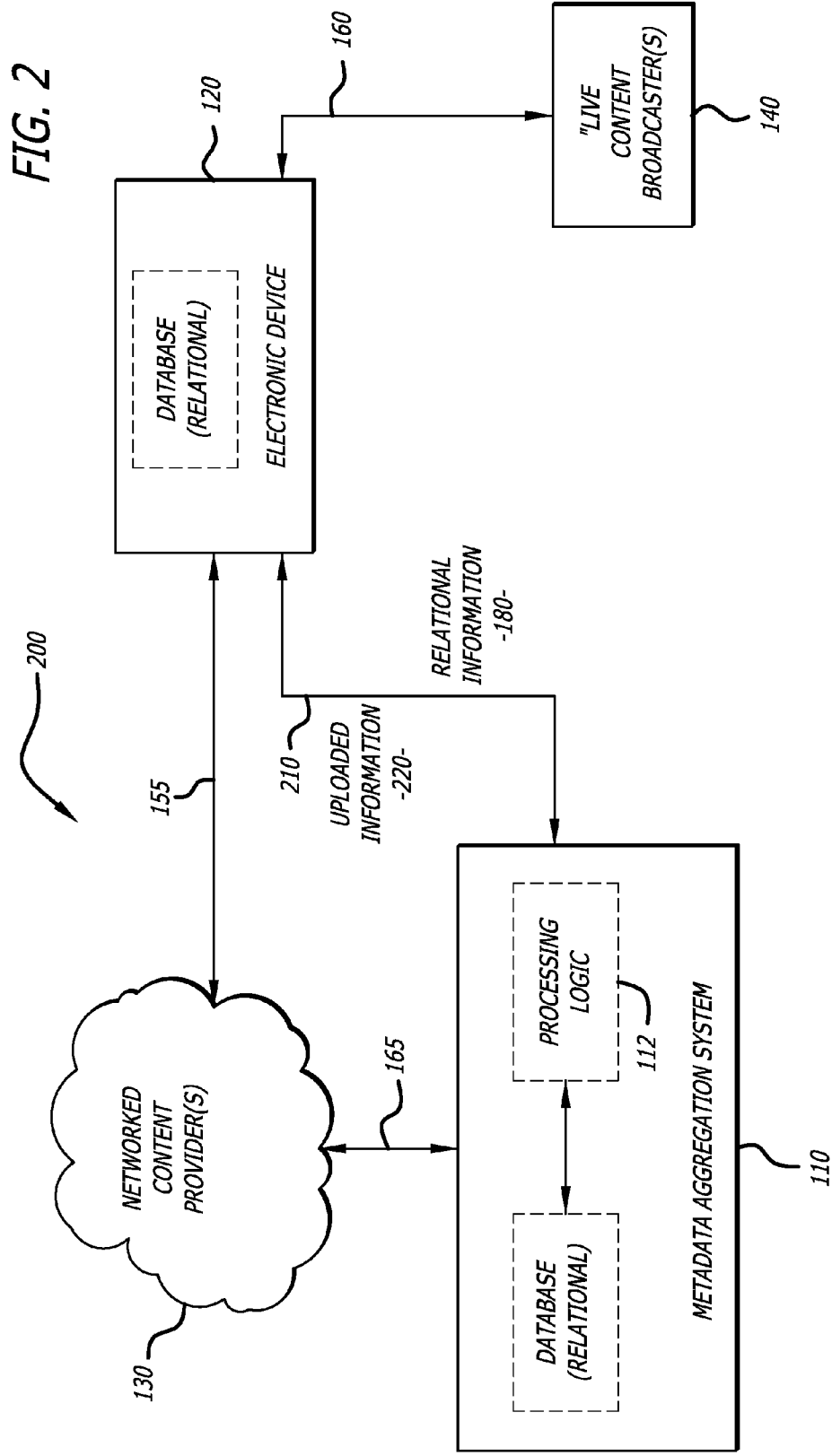
FIG. 2 is a second exemplary embodiment of the content transmission system having multiple content sources.

Referring now to FIG. 2, a second illustrative embodiment of a content transmission system 200 is shown. Herein, content transmission system 200 includes metadata aggregation system 110 and electronic device 120 that are in communication with network content provider(s) 130 and live content broadcaster(s) 140. Unlike the content transmission system of FIG. 1, metadata aggregation system 110 provides an optimized architecture where bidirectional communications with electronic device 120 over interconnect 210 are established. Furthermore, metadata aggregation system 110 is adapted to receive uploaded information 220 that can be used to determine what metadata is needed from networked content provider(s) 130.

For instance, according to one illustrative example, electronic device 120 may upload information 220 for identifying a particular channel to which it is tuned to metadata aggregation system 110. This uploaded information 220, namely a filtering parameter that may be combined with other filtering parameters (e.g., zip code), can be utilized by metadata aggregation system 110 to create a request message for appropriate metadata from networked content provider(s) 130 (hereinafter "metadata request message"). According to another illustrative example, electronic device 120 may upload EPG data that identifies the programming content currently being broadcast and scheduled to be broadcast by one or more live content broadcasters 140. From this EPG data, processing logic 112 can initiate a request for metadata associated with each of the programs scheduled to be broadcast from live content broadcaster(s) 140.

In addition, electronic device 120 may upload metadata associated with content stored within internal memory or within one of its peripherals. For example, the title of programming content stored on a personal video recorder (PVR) in communication with or integrated as part of electronic device 120 may be uploaded. Metadata aggregation system 110 uses the stored metadata to generate a metadata request message seeking metadata associated with content at least similar to (and perhaps identical to) the PVR stored content.

As an illustrative embodiment, the PVR stored content may be a particular episode of a television series in standard definition (SD) format while, after requesting metadata for that particular episode, electronic device 120 receives metadata that identifies that a networked content provider is storing that episode in a high definition (HD) format. Similar to the above-described content transmission system of FIG. 1, based on received metadata, metadata aggregation system 110 produces relational information 180, which corresponds to a selected advanced option that allows the user of electronic device 120 to navigate to web pages stored by the networked content provider, is uploaded to electronic device 120.

As represented by dash line, relational database 114 along with processing logic 112 are currently implemented in metadata aggregation system 110 although it is contemplated that such capabilities could be integrated within electronic device 120 itself as represented by dashed lines for database 114. For such an implementation, in lieu of relying on metadata aggregation system 110, electronic device 120 would retrieve the metadata associated with the stored content that corresponds to the broadcasted programming content.

Figure 3:
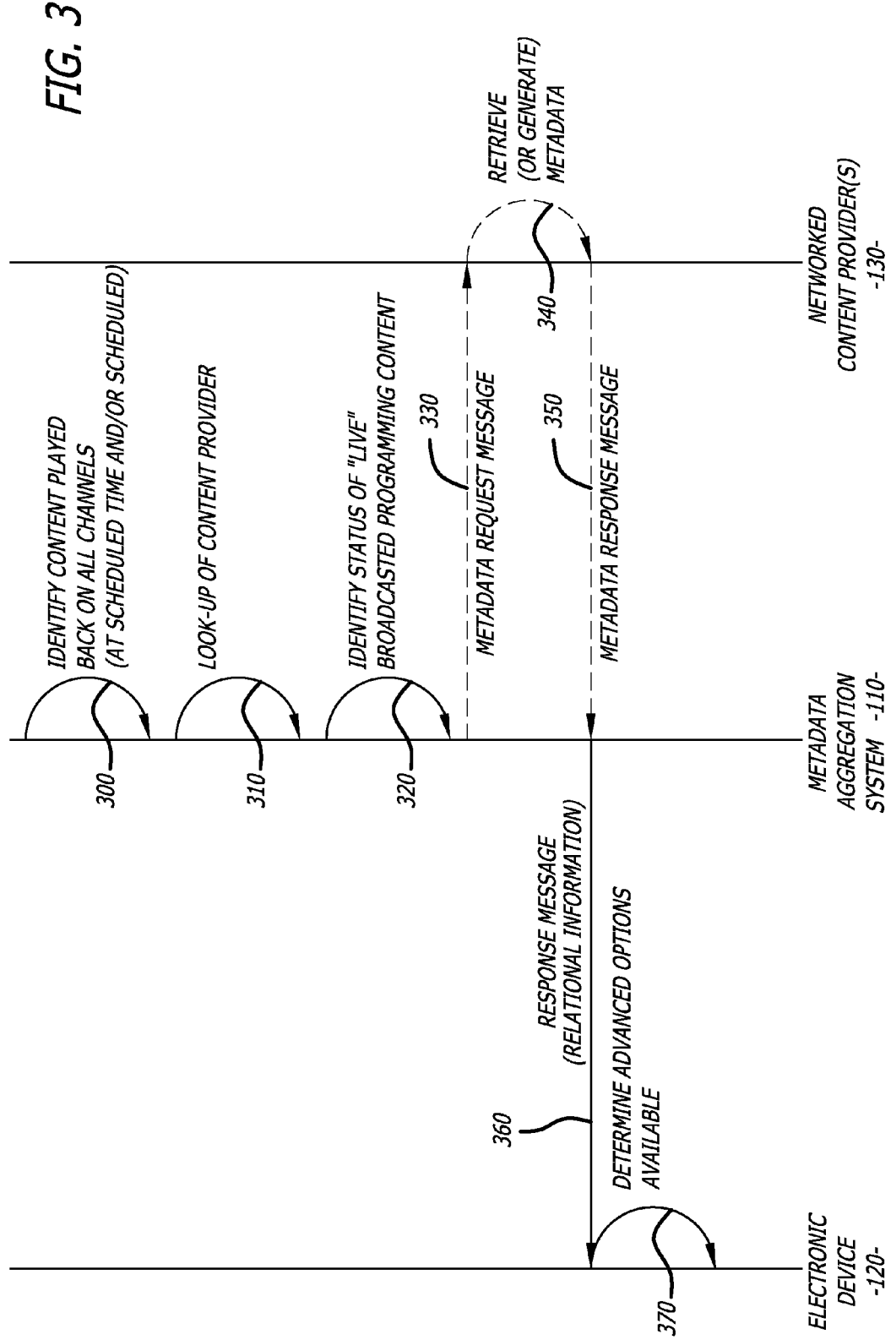
FIG. 3 is an exemplary embodiment of the communications within the content transmission system of FIG. 1.

Referring to FIG. 3, an exemplary embodiment of the communications performed by first content transmission system 100 of FIG. 1 is shown. Initially, metadata aggregation system 110 identifies what programming content is currently being transmitted by live content broadcaster(s) available to electronic device 120 and/or is scheduled to be transmitted (item 300). This information may be obtained from incoming EPG data associated with programming content offered by the live content broadcaster(s) available to electronic device 120. As an illustrative example, the incoming EPG data may be EPG data associated with programming content offered by each and every live content broadcaster who offers service to the geographic location in which the electronic device 120 resides. The geographic location may be learned from pre-stored data (e.g., certain zip code assigned to a leased electronic device 120) or ascertained from the Internet Protocol (IP) or Media Access Control (MAC) address assigned to electronic device 120. The EPG data is provided from the live content broadcaster(s) and/or third party sources.

Thereafter, metadata aggregation system 110 performs a look up of networked content provider(s) to determine if a provider for such content (and the location of such content) has been recently acquired (item 310). Also, the look-up operation is conducted to coordinate one or more requests for metadata associated with the stored content corresponding to the programming content that is currently being transmitted and/or is scheduled to be transmitted to account for programming changes and to verify that the network-based content is still present.

Additionally, metadata aggregation system 110 identifies the status of the "live" broadcasted programming content (item 320). This may involve identifying the receipt time of the metadata request and the corresponding temporal location within the broadcasted programming content when the request was made. For instance, where a request is determined to have occurred at 11:15 AM and the broadcast of the programming content started playback at 11:00 AM, at most, fifteen minutes of programming has elapsed.

Thereafter, as an optional feature represented by dashed lines, a metadata request message is sent from the metadata aggregation system to the networked content provider(s) (item 330). The transmission of the metadata request message is designed to account for programming changes that may result from "live" event (e.g., sporting event, televised concert, etc.) exceeding its allocated time slot as well as verify the continued persistence storage of such content. The metadata request message may be performed automatically such as at predetermined time periods such as a few minutes before changes to programming content will likely occur (e.g., "at the hour" and "half-past the hour") or manually (e.g., in response to operation event such as a power-on, EPG update, etc,).

Upon transmitting the metadata request message, electronic device 120 retrieves the metadata for the stored content associated with the broadcast programming content as shown as item 340. The metadata is returned to the metadata aggregation system 110 via a metadata response message (item 350). The metadata aggregation system extracts the metadata from the response message, organized and stored the metadata, and produces the relational information that is routed to electronic device 120 (item 360). From the relational information, electronic device 120 determines which advanced options are available and organizes the relational information to support these advanced options (item 370).

Figure 4:
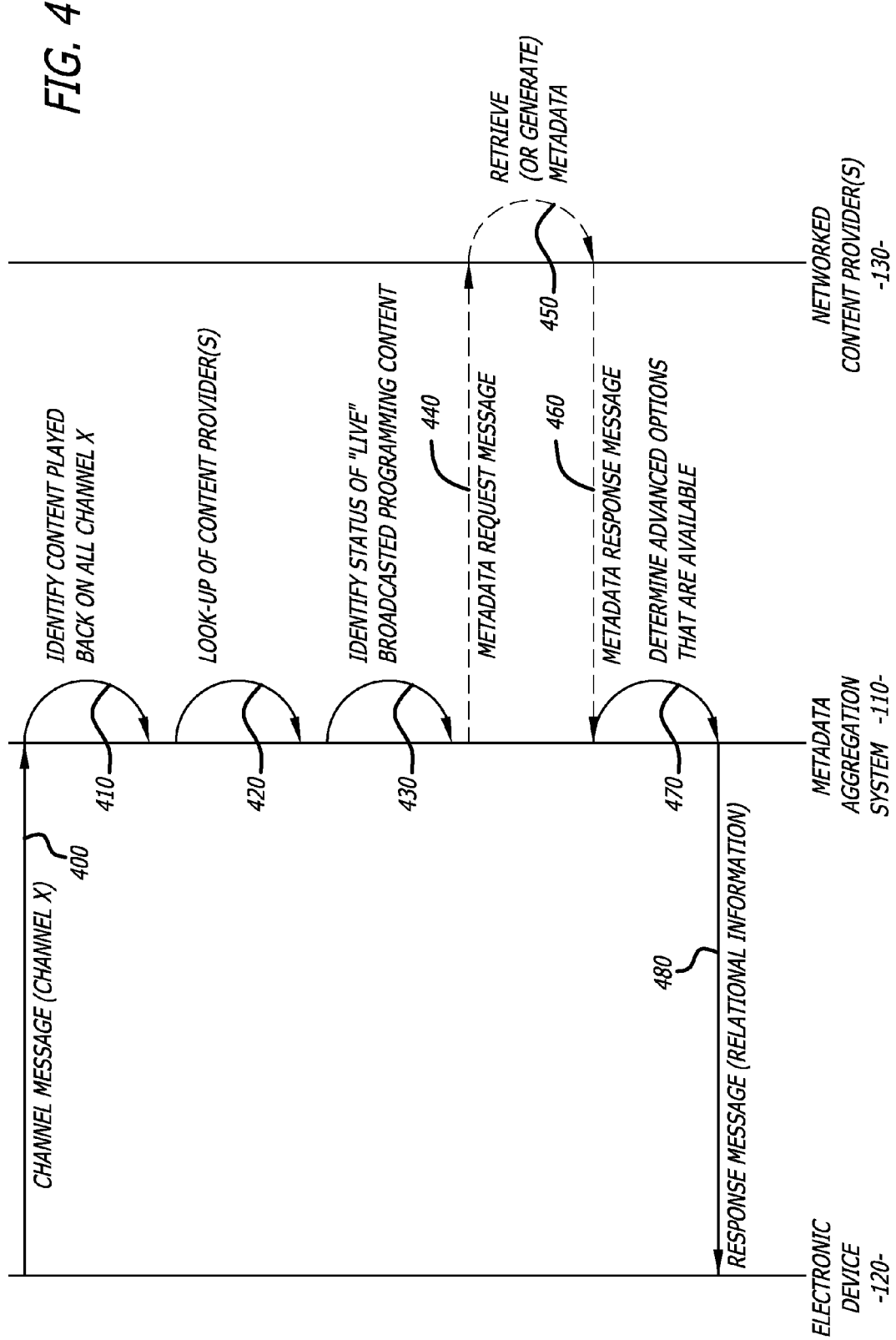
FIG. 4 is an exemplary embodiment of the communications within the content transmission system of FIG. 2.

Referring now to FIG. 4, an illustrative embodiment of communications undergone by the second content communication system is shown. Initially, metadata aggregation system 110 is adapted to receive information that can be used to determine the appropriate channel to which electronic device 120 is tuned (item 400). For example, according to one embodiment of the invention, the information may specifically identify the particular channel and/or live content broadcaster. Alternatively, according to another embodiment of the invention, the information may include a program title that can be used to identify the tuned channel if metadata aggregation system 110 has access to EPG data and the current time. Also, according to yet another embodiment of the invention, information may include subtitle or closed-caption (CC) information if metadata aggregation system 110 is adapted to conduct comparisons between such information and the subtitle or CC information for a wide variety of programming content.

Next, metadata aggregation system 110 identifies what programming content is currently being transmitted by live content broadcaster(s) available to electronic device 120 and/or is scheduled to be transmitted (item 410). This information may be obtained from incoming EPG data associated with programming content offered by the live content broadcaster(s) available to electronic device 120. The EPG data may be restricted to programming content offered by each and every live content broadcaster who offers service to a certain geographic location in which electronic device 120 resides. The geographic location may be determined based on zip code, IP address associated with electronic device 120, or any other information that can be used for geographical approximation. The EPG data is provided from the live content broadcaster(s) and/or third party sources.

Thereafter, metadata aggregation system 110 performs a look up of networked content provider(s) to determine if a provider for such content (and the location of such content) has been recently acquired (item 420). Also, the look-up operation is conducted to coordinate one or more requests for metadata associated with the programming content that is currently being transmitted and/or is scheduled to be transmitted. Filtering parameters may be used in order to better target the search for this metadata.

Metadata aggregation system 110 identifies the status of the "live" broadcasted programming content (item 430). This may involve identifying the receipt time of the request and the corresponding location within the broadcasted programming content when the request was made.

As an optional feature described above, a metadata request message is sent from the metadata aggregation system to the networked content provider(s) (item 440). The transmission of the metadata request message may be performed automatically or manually. Thereafter, the metadata for the stored content associated with the broadcast programming content is retrieved (or generated) as shown as item 450. The metadata is returned to the metadata aggregation system 110 via a metadata response message (item 460).

The metadata aggregation system 110 determines which advanced options are available and organizes relational information to support these advanced options (item 470). Thereafter, a response message including the relational information is provided to electronic device 120 from which electronic device 120 renders icons associated with these advanced options (item 480).

Figure 5:
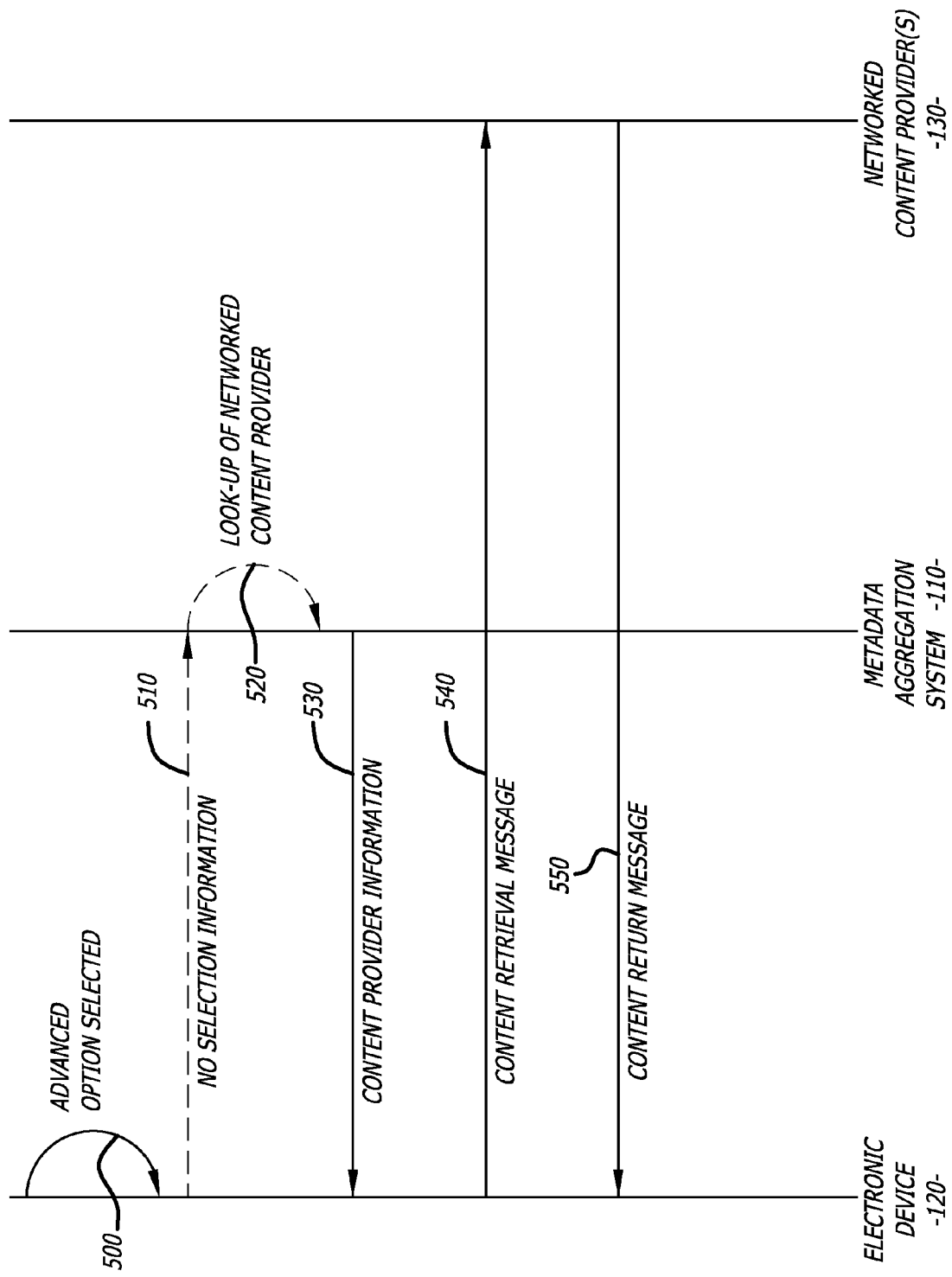
FIG. 5 is an exemplary embodiment of the communications within a content transmission system upon selection of an advanced option in which the URL associated with the network content provider in accordance with the advanced options selected is dynamic.

Referring now to FIG. 5, an exemplary embodiment of the communications within a content transmission system upon selection of an advanced option is shown. Herein, an advanced option is selected by an operator of electronic device 120 and, if needed, relational information associated with the selected advanced option is requested by metadata aggregation system 110 (items 500 & 510). For instance, where metadata aggregation system 110 supports a small number of advanced options, electronic device 120 may store the relational information necessary to retrieve network-based content corresponding to programming content. However, when supporting a large number of advanced options, as an optional feature represented by dashed lines, metadata aggregation system 110 may issue an Advanced Options message to request relational information associated with the selected advanced option. This reduces the amount of memory needed within electronic device 120.

After transmission of the Advanced Options message, metadata aggregation system 110 performs a look-up to recover information that can be used to establish communications between electronic device 110 and networked content provider(s) 130 (item 520). For instance, metadata aggregation system 110 performs a look-up to recover a uniform resource locator (URL) of a server controlled by networked content provider(s) 130 that stores content associated with the advanced options and the memory location for such content.

The recovered information is transferred from metadata aggregation system 110 to electronic device 120 (item 530). This allows electronic device 120 to establish communications with networked content provider(s) 130 in order to retrieve content associated with the advanced option selected (items 540 and 550).

Figure 6:
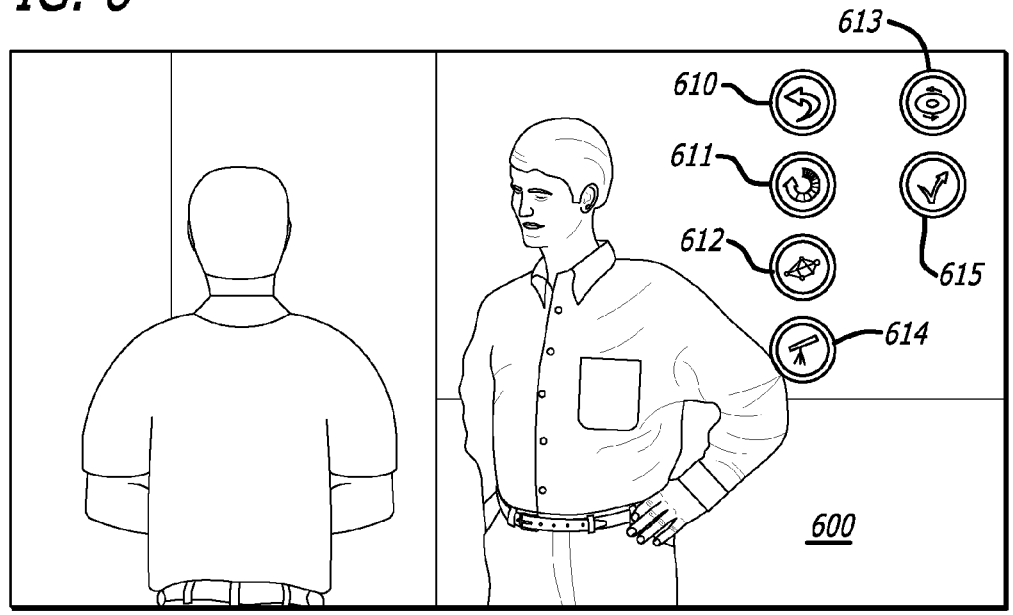
FIG. 6 is an exemplary embodiment of a screen display for the electronic device illustrated in FIGS. 1 and 2 that displays selectable icons for the advanced options supported by the metadata aggregation system.

Referring to FIG. 6, an exemplary embodiment of a screen display produced by electronic device 120 of FIGS. 1 and 2 with selectable icons corresponding to advanced options supported by metadata aggregation system 110 is shown. Herein, electronic device 120 features circuitry (not shown) that is adapted to receive content as well as relational information from which advanced option icons 610-614 are rendered for display on a display screen 600. For this embodiment, the received content is broadcasted programming content.

Figure 7:
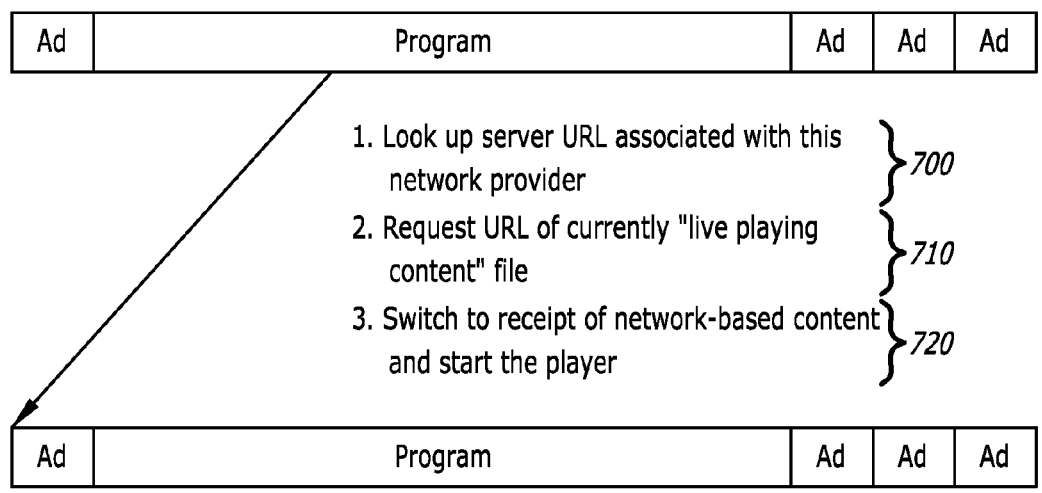
FIG. 7 is an exemplary embodiment of a first advanced option supported by the metadata aggregation system.

A first advanced option icon 610 (i.e. the Start Over icon) supports "start over" functionality, which alters the source of content being played back from broadcasted programming content to the start of corresponding content provided over the network. More specifically, as shown in FIG. 7, upon selection of the Start Over icon 610 during viewing and/or listening of programming content supplied by a live content broadcaster, electronic device 120 of FIG. 1 is configured to alter the source of incoming content from a live content broadcaster to a networked content provider having access to corresponding stored content. This involves electronic device 120 determining both a link 700 (e.g., URL) for the networked content provider (referred to as the "provider link" 700) and a link 710 identifying content stored by the network content provider that is substantially similar (or identical) to currently broadcasted programming content from the live content broadcaster (hereinafter "stored content link" 710). Such information may be retrieved from the metadata aggregation system by providing the channel information to the metadata aggregation system.

Thereafter, the electronic device 120 switches to receive and playback the stored content associated with the link 710 beginning at the start of the stored content in lieu of at the point in the broadcasted programming content when Start Over icon is selected. This is accomplished by activating player logic responsible for playback of the network-based content stored by a content provider while logic responsible for tuning to receive the broadcasted programming content is temporarily halted.

Figure 8:
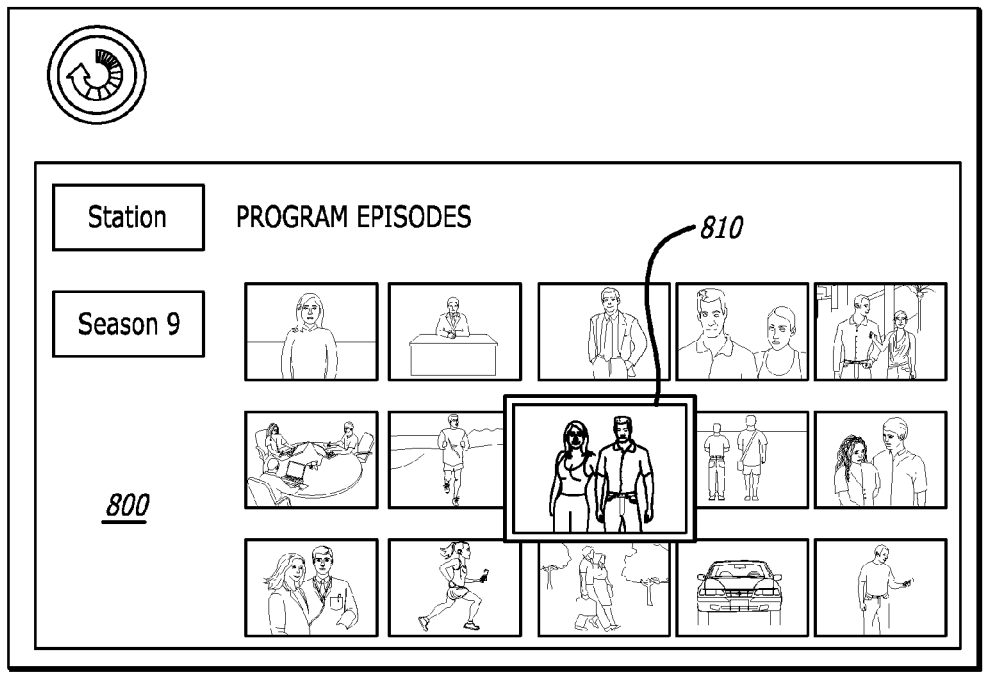
FIG. 8 is an exemplary embodiment of a second advanced option supported by the metadata aggregation system that, when selected, illustrates selectable images of post-broadcast episodes of a specific program series currently being broadcast.

Referring back to FIG. 6, when selected, a second advanced option icon 611 (i.e. the Catch Up icon) causes electronic device 120 to list all of the previously broadcasted episodes for the broadcasted programming content currently being displayed. More specifically, as shown in FIG. 8, upon selection of the Catch Up icon 611 during viewing and/or listening of programming content supplied by a live content broadcaster, electronic device 120 of FIG. 1 is configured to display a listing 800 of previously broadcasted episodes 800 for the current season (e.g., Season 9) that are remotely stored and accessible. This allows the user to "catch up" on the program in the event that the plot is continuous between episodes.

As shown in FIG. 8, a past episode 810 of Season 9 for the multi-episode program is selected for display, which causes electronic device 120 to access a link (e.g., URL) associated with past episode 810 to retrieve that content stored at a networked content provider. Thereafter, electronic device 120 processes the stored content for rendering the stored content for display.

Figure 9A:
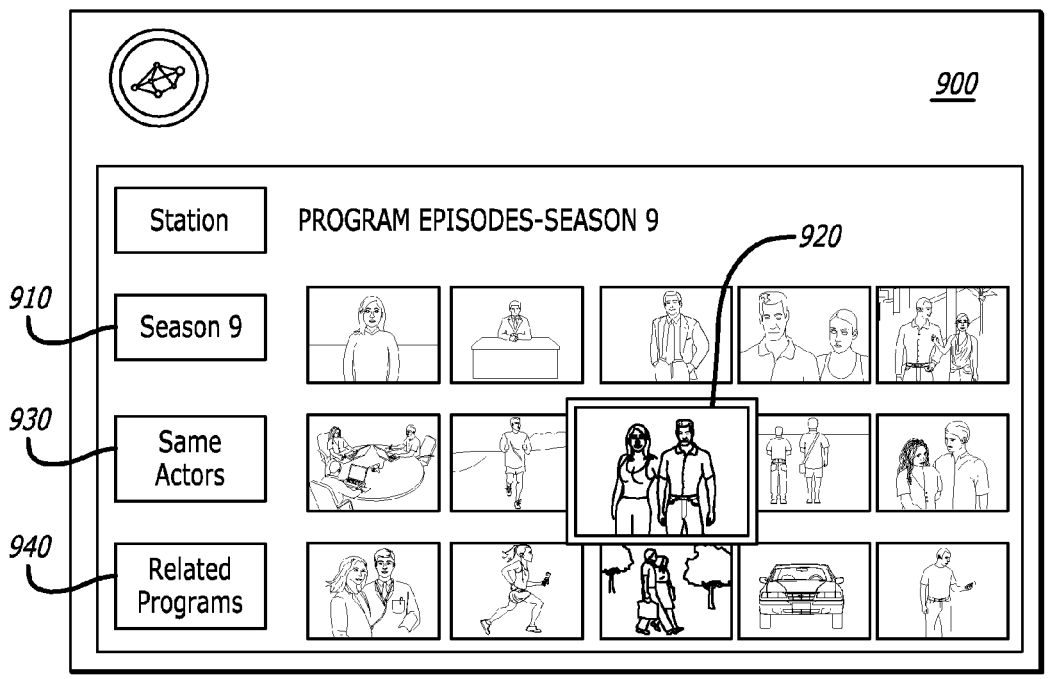
FIG. 9A is an exemplary embodiment of a third advanced option supported by the metadata aggregation system that, when selected, illustrates selectable images of programs related to a specific program series currently being broadcast.

Referring back to FIG. 6, a third advanced option icon 612, referred to as the Related icon 612, lists all of the episodes associated with different seasons of the multi-episode program and perhaps even programs related to the multi-episode program currently being displayed. More specifically, as shown in FIG. 9A, upon selection of Related icon 612 during viewing and/or listening of programming content supplied by a live content broadcaster, electronic device 120 of FIG. 1 is configured to display a listing 900 of previously broadcasted episodes from different seasons that are available from the networked content providers as well as related programs.

According to this embodiment, the episodes for different seasons may be accessed by selecting Seasons object 910, which causes a listing of each season of a program with episodes stored by one of the content provider(s). As shown, Season 9 has been selected so to now display each of the episodes associated with Season 9 of a particular television program. An eighth episode 920 is selected for display and is retrieved by electronic device 120 upon obtaining the link (e.g., URL) associated with the selected episode that identifies where such content is stored at the networked content provider.

In addition, listing 900 may feature an object 930 that, when selected, causes the electronic device to generate selectable image icons of programs featuring the same actors starring in the current program. Also, listing 900 may feature an object 940 that, when selected, causes the electronic device to generate selectable image icons representing programs related to the currently broadcast program, such as a different version of the same program (e.g., CSI Miami® when CSI NY® is being televised).

Referring now to FIGS. 6 and 9B, upon selection of Related icon 612 during viewing and/or listening of content supplied by a live content broadcaster, electronic device 120 of FIG. 1 may also be configured to generate a display screen 950 that illustrates advertisement icons 960 that are directed to advertisements of various goods and/or services. Moreover, display screen may feature video clips 970, images 980 or audio clips 990 that are related to the content. Herein, video clips of related content, including advertisements of goods and/or services, are listed upon selection of video clip icon 970. The images and audio clips of related content may be listed upon selection of image icon 980 and audio clip icon 990, respectively. These products may be restricted to goods and/or services shown in the currently displayed content or may be selected independent of the subject matter within the displayed content.

A fourth advanced option icon 613 supports "trick play" functionality, which alters the viewing and/or listening from broadcasted programming content to content provided over the network and attempts to coordinate the start of the playback of the network-based content to coincide with the last playback segment of the broadcasted programming content. More specifically, as shown in FIG. 10, when available and upon selection of the Trick Play icon 613 during viewing and/or listening of programming content supplied by a live content broadcaster, electronic device 120 of FIG. 1 is configured to alter the source of incoming content from a live content broadcaster to a networked content provider.

The "trick-play" feature involves the electronic device determining both provider link 1000 (e.g., URL) for the networked content provider and stored content link 1010 providing access to the content stored by the network content provider that is substantially similar (or identical) to currently broadcasted programming content from the live content broadcaster. Thereafter, the electronic device switches to receive and playback the stored content associated with the link 1010 beginning at the position corresponding to where the playback of the programming content ceased (e.g., approximately at the time of selected of the Trick-Play icon 613). Player logic responsible for playback of the content stored by a content provider is started while logic responsible for tuning to receive the broadcasted programming content is temporarily halted (item 1020).

Figure 11:
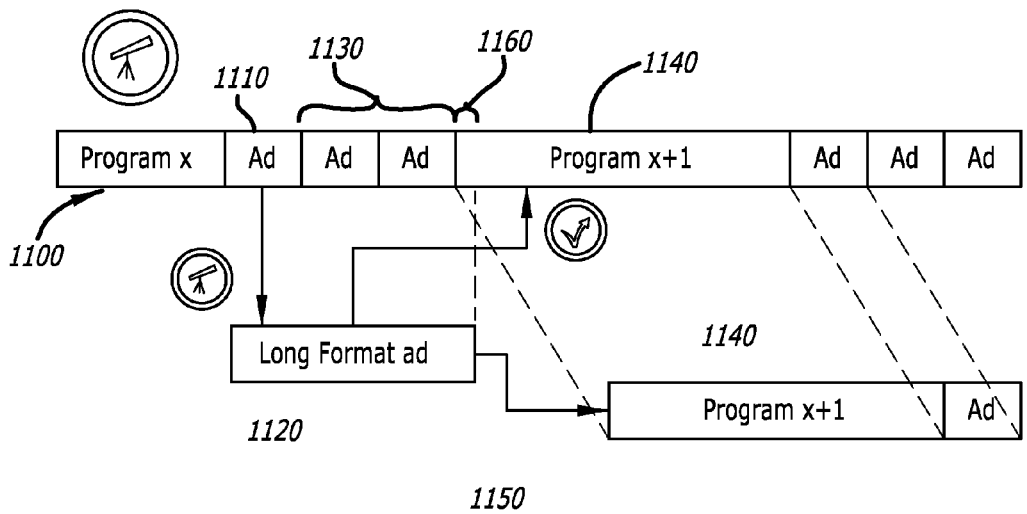
FIG. 11 is an exemplary embodiment of a fifth advanced option supported by the metadata aggregation system in which advertisements can be selected for display in a longer format than normally prescribed in the broadcast transmission.

Referring now to FIG. 11, an exemplary embodiment of a fifth advanced option supported by the metadata aggregation system in which advertisements contained in broadcasted programming content 1100 can be selected for display in a longer format than normally prescribed in the broadcast transmission is described. Upon selection of Ad Telescoping icon 614 during viewing and/or listening of an advertisement 1110 provided by a live content broadcaster, electronic device 120 of FIG. 1 may also be configured to generate a display screen that illustrates a longer version 1120 of advertisement 1110. As a result, after completing playback of the longer version 1120 of the advertisement, the electronic device may be adapted to skip the remaining advertisements 1130 preceding a next segment of a program 1140 being viewed and begin displaying network-based content 1150 corresponding to the broadcasted programming content.

Alternatively, it is contemplated that, upon depression of Ad Telescoping icon 614 (or an additional icon 615), the electronic device returns to display program 1140 at a point in time offset 1160 by the amount of time that the longer version 1120 of the advertisement exceeds the remaining advertisements 1130.

Figure 12:
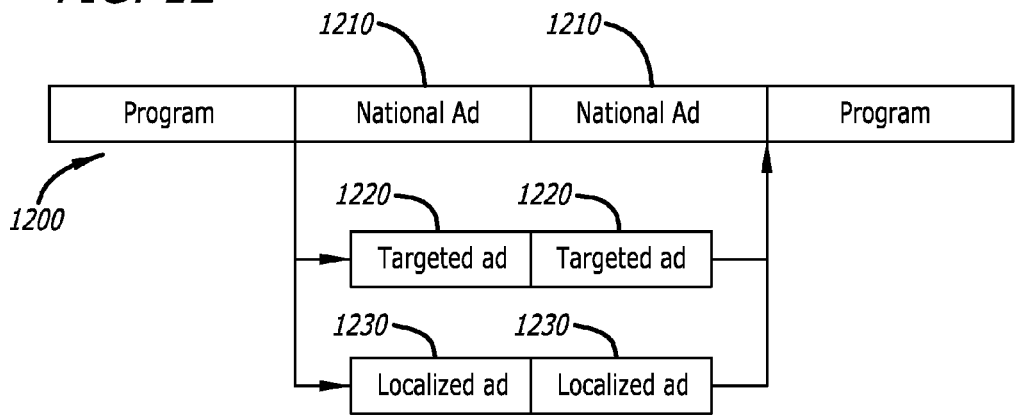
FIG. 12 illustrates an exemplary embodiment in which national advertisements within the broadcast programming content are substituted with localized advertisements.

Referring now to FIG. 12, an exemplary embodiment in which national advertisements 1210 within broadcast programming content 1200 are substituted with targeted advertisements 1220 and/or localized advertisements 1230 is described. Automatically or through access of a set-up configuration for the electronic device, national advertisements 1210 within broadcasted programming content 1200 may be substituted with stored advertisements (i.e. advertisements being part of network-based content). These stored advertisements may be targeted advertisements 1220 being advertisements that are consistent with pre-programmed preferences of the viewer. Alternatively or in addition to targeted advertisements, national advertisements 1210 may be substituted with localized advertisements being advertisements allocated for a selected geographic region in which the electronic device resides (or a region selected by the user).

Having disclosed exemplary embodiments and the best mode, modifications and variations may be made to the disclosed embodiments while remaining within the scope of the embodiments of the invention as defined by the following claims.

What is claimed is:

1. Device comprising:
at least one computer memory that is not a transitory signal, the computer memory comprising instructions executable by at least one processor for:
sending an identification of at least one broadcast video on a display to a network server as a request for relational information;
receiving, responsive to the request, relational information associated with stored content that corresponds to the broadcast video;
based at least in part of the relational information received in response to the request, present on the display at least one selectable icon selectable to present the stored content on the display to replace the broadcast video, the icon being selectable to alter a source of content being presented on the display from broadcast content to the start of corresponding content provided over a network, the corresponding content being the same content as the broadcast content and being presented at a starting point of the corresponding content which corresponds to a starting point of the broadcast content.

2. The device of claim 1, wherein the instructions when executed by the processor configure the processor to transmit the relational information to an apparatus that includes the display.

3. The device of claim 1, wherein the instructions when executed by the processor configure the processor to receive electronic program guide (EPG) data for a geographic area for an apparatus that includes the display, the geographic area being determined by addressing information assigned to the apparatus.

4. The device of claim 1, wherein the device is a television.

5. The device of claim 1, wherein the instructions when executed by the processor configure the processor to transmit a metadata request message to a networked content provider to receive in return metadata associated with the broadcast video, which is scheduled to be broadcast from a live content broadcaster.

6. The device of claim 1, wherein the instructions when executed by the processor configure the processor to, based on the relational information, list all previously broadcasted episodes for the broadcast video.

7. The device of claim 1, wherein the instructions when executed by the processor configure the processor to, based on the relational information, list all episodes associated with different seasons of the broadcast video.

8. The device of claim 1, comprising the at least one processor.

* * * * *